United States Patent [19]
Dischert

[11] 4,417,269
[45] Nov. 22, 1983

[54] ADAPTIVE RECONSTRUCTION OF THE COLOR CHANNELS OF A COLOR TV SIGNAL

[75] Inventor: Robert A. Dischert, Burlington, N.J.

[73] Assignee: RCA Corporation, New York, N.Y.

[21] Appl. No.: 278,447

[22] Filed: Jun. 29, 1981

[51] Int. Cl.³ .............................................. H04N 9/32
[52] U.S. Cl. ...................................... 358/12; 358/13;
    358/133; 358/138; 375/31; 375/33
[58] Field of Search ................... 358/12, 13, 133, 138;
    375/31, 33

[56] References Cited
U.S. PATENT DOCUMENTS
4,051,516  9/1977  Weston .................................. 358/13
4,065,784 12/1977  Rossi ..................................... 358/13

Primary Examiner—Richard Murray
Attorney, Agent, or Firm—E. M. Whitacre; W. H. Meise; H. I. Steckler

[57] ABSTRACT

An encoding apparatus samples the luminance component of a video signal at a rate sufficient to avoid aliasing. Wide band chroma components are sampled at one half this rate so that aliasing occurs. A decoder determines the direction of least resolution of each sample of the luminance signal and averages the chroma signals in this direction for each sample to eliminate aliases.

12 Claims, 19 Drawing Figures

ENCODER

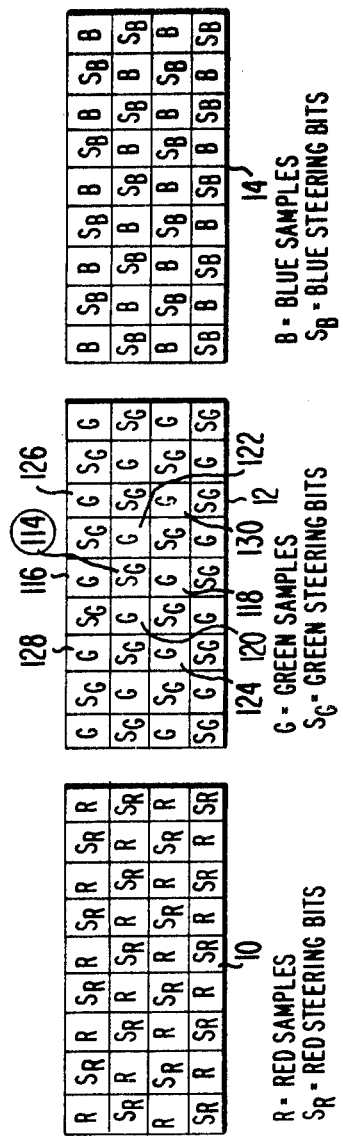
Fig. 1 – AN ADAPTIVE COMPONENT SYSTEM
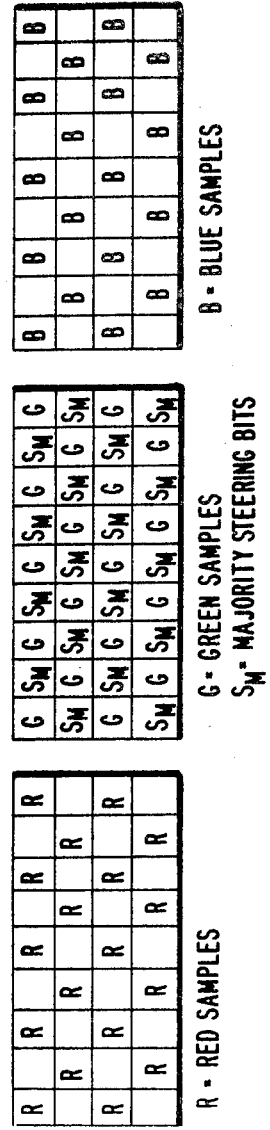
Fig. 3 – DATA REQUIRED WITH A SINGLE SET OF STEERING BITS

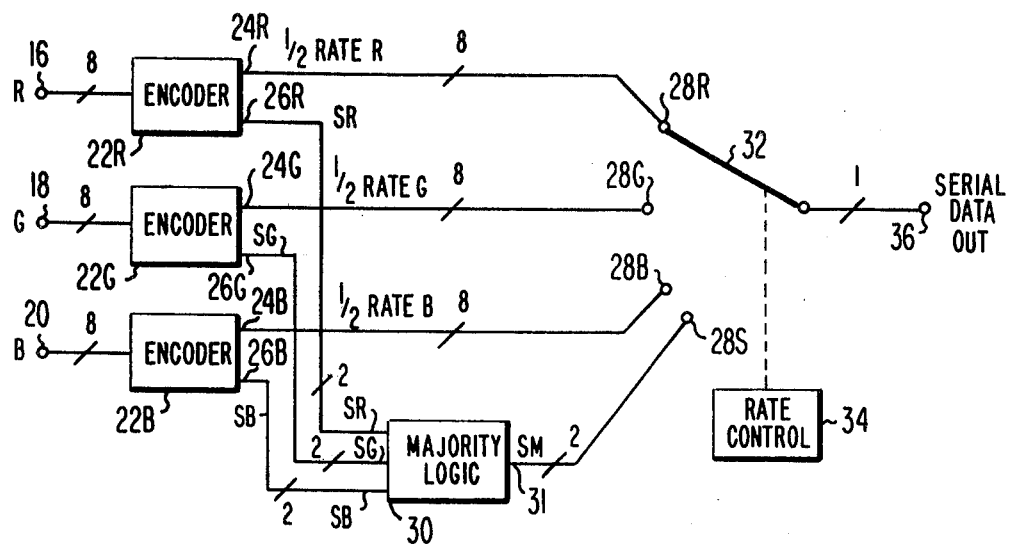
Fig. 2 — AN ADAPTIVE COMPONENT SYSTEM WITH A SINGLE SET OF STEERING BITS
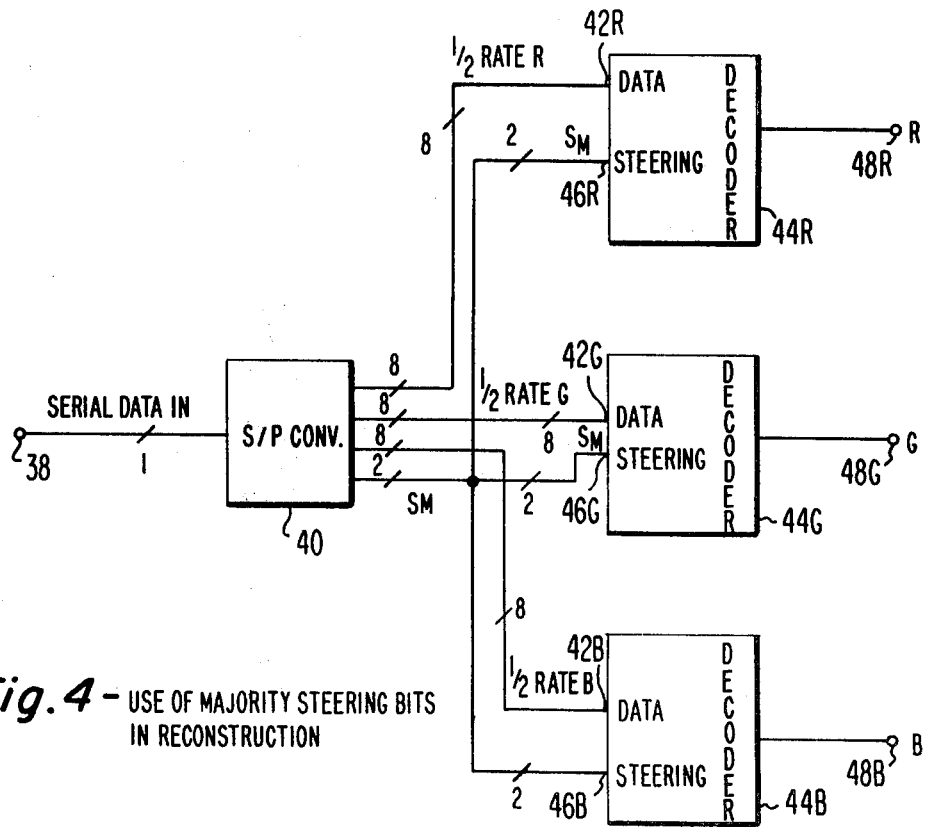
Fig. 4 — USE OF MAJORITY STEERING BITS IN RECONSTRUCTION

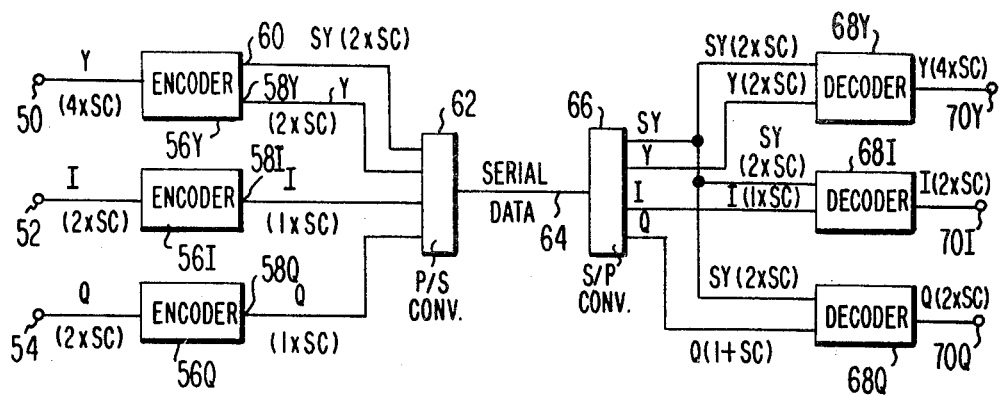
Fig. 5 — USE OF LUMINANCE STEERING BITS IN AN ADAPTIVE COMPONENT SYSTEM
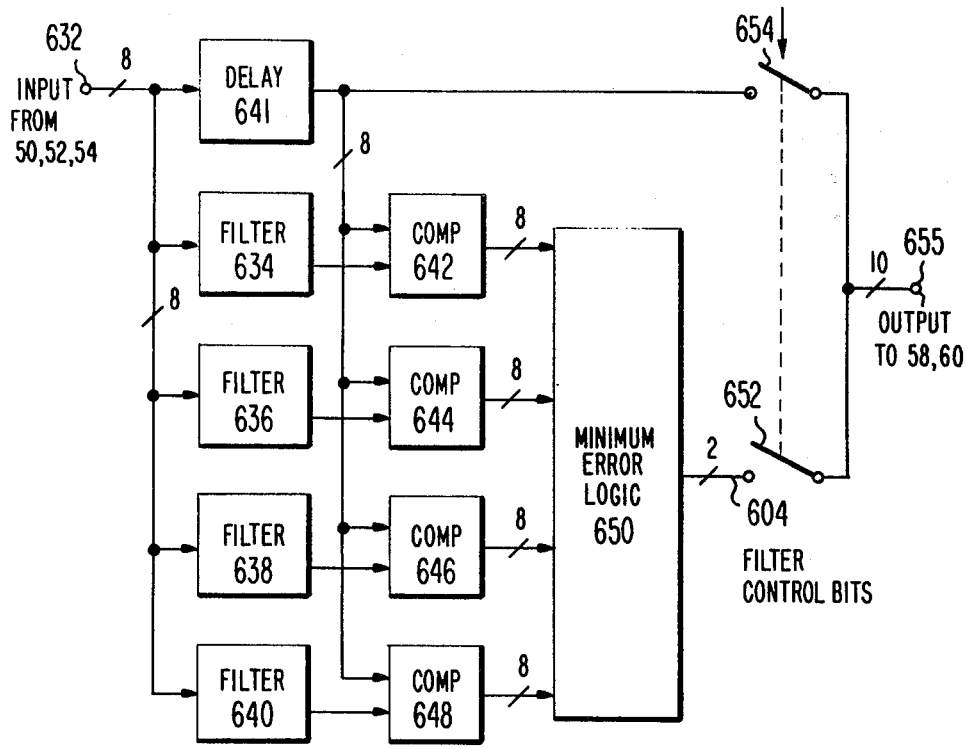
ENCODER
Fig. 6

1

ADAPTIVE RECONSTRUCTION OF THE COLOR CHANNELS OF A COLOR TV SIGNAL

BACKGROUND OF THE INVENTION

The present invention relates to transmission systems, and more particularly, to plural channel color television systems with different channel bandwidths.

A proposed television system has a wide bandwidth luminance channel and narrow-bandwidth chroma channels. In particular, the luminance channel is sampled at four times the chroma subcarrier frequency, while two chroma channels are sampled at only twice said frequency to conserve bandwidth; this is known as the 4:2:2 system. However in this system the color signal resolution is limited to one half the luminance signal resolution to avoid aliasing in the narrow bandwidth color channels.

It is therefore desirable to have a system where all channels have a more nearly equal resolution without increasing the bandwidth of the channel through which they pass.

SUMMARY OF THE INVENTION

A method and apparatus for removing aliases from at least a first component signal of a video signal using one alias-free component of said video signal, comprising determining from said alias free component the direction of least resolution, and averaging said alias containing component in said direction.

DESCRIPTION OF THE DRAWINGS

FIG. 1 shows a diagram useful in explaining the prior art showing portions of three sampled line-scan rasters which all have distinct sets of steering bits;

FIG. 2 is a block diagram of a transmitter in accordance with the prior art;

FIG. 3 shows portions of sampled rasters of three channels, only a single channel transmitting steering bits which are located in place of undisplayed deleted samples;

FIG. 4 is a block diagram of a receiver in accordance with the prior art;

FIG. 5 is a block diagram of a transmission system including a receiver as in FIG. 4 together with an alternate embodiment of a transmitter;

FIG. 6 illustrates a block diagram of an encoder for encoding samples of a video signal and control signals in accordance with an embodiment of the invention;

FIG. 17 shows sample patterns on a scanning raster; and

DETAILED DESCRIPTION

Figure 7:
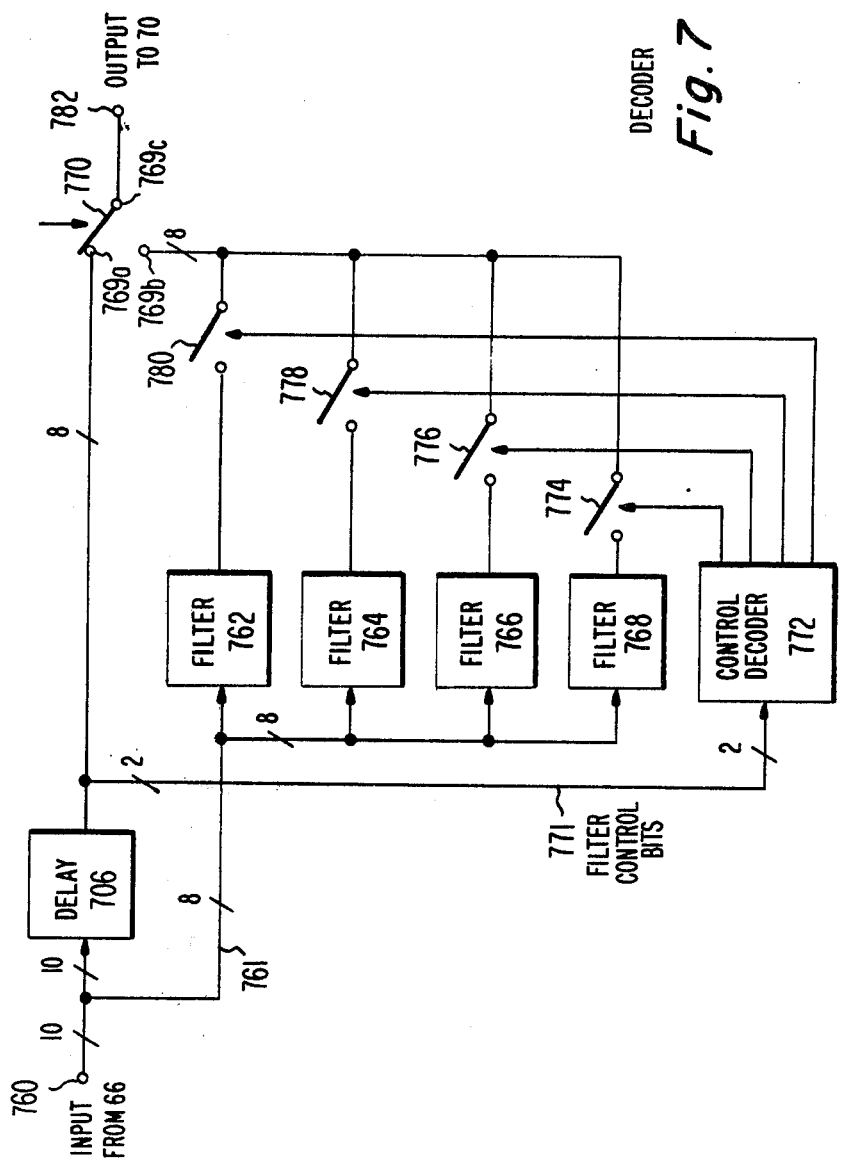
FIG. 7 illustrates a block diagram of a decoder for decoding information encoded by the apparatus of FIG. 6.

FIG. 1 shows portions of sampled line scanned rasters 10, 12 and 14 respectively and associated signals representative of the red, green and blue color components of a scene. The symbols R, G, and B, indicate red, green and blue picture samples of the rasters 10, 12 and 14 that will be transmitted. These transmitted samples occur at a 7.16 MHz rate in a preferred embodiment, which is twice the NTSC color subcarrier frequency. Thus, a sample occurs every 140 nanoseconds. The letter S with appropriate subscript represents steering bits that would be transmitted in place of deleted samples of picture elements if the system of prior U.S. application Ser. No. 132,137, filed Mar. 20, 1980, is used for each channel. The steering bits also occur at a 7.16 MHz rate. It will be noted that every other sample of the video signal originally sampled at a 14.32 MHz rate has been deleted in each raster and that the position of the deleted samples in the raster alternates in a position from horizontal line to horizontal line, and therefore the position of the steering bits alternates from line to line. This alternation enables the steering bits to contain information as to which of the surrounding four pairs of transmitted samples is the closest match to a particular deleted sample. In FIG. 1, for the particular deleted sample designated 114 in the green field, the average of the vertically adjacent samples 116 and 118, the average of the horizontally adjacent samples 120 and 122, the average of the left diagonal samples 128 and 130, or the average of the right diagonal samples 126 and 124, are compared with sample 114, and the results of the comparisons are evaluated by a logic circuit to determine which average of the surrounding samples to be transmitted is the best approximation to sample 114, which is not to be transmitted. In place of deleted sample 114, a set of steering bits is added to the bits carrying information as to the amplitude of previous transmitted sample 120. Since in the above example there are four choices, the steering word can comprise as few as two bits, and since they are replacing a deleted sample of eight bits, there is a net reduction in the amount of information being transmitted (see said prior application for a fuller explanation). The same concept is used for the red and blue fields to generate steering bits, for total of three sets of steering bits.

The prior U.S. application Ser. No. 171,379, filed July 23, 1980, uses a single set of steering bits to control the steering in all three channels. This is possible because the three channels of components of a television signal, e.g., R, G, B, or Y, I, Q, are normally highly redundant when representing a typical scene, and therefore one set of steering bits will suffice to indicate the direction of resolution in all three; that is to say, that at the same time the three channels will not ordinarily have edges in different directions, the edges will occur in the same direction.

FIG. 2 shows a block diagram of a transmitter for carrying out the prior concept. Red, green and blue color digital component signals representative of a single television raster scan signal are received at input terminals 16, 18 and 20 respectively. They are applied to encoders 22R, 22G, and 22B respectively. Outputs 24R, 24G, and 24B supply eight parallel digital bits representing every other sample of the respective input signals to switch contacts 28R, 28G, and 28B respectively for a time period until the next sample is present at outputs 24R, 24G, and 24B. For example, if the signals at inputs 16, 18 and 20 occur at 70 nanosecond intervals, the signals at outputs 24R, 26G, and 24B, are each simultaneously present for 140 nanoseconds. Outputs 26R, 26G, and 26B each provide two steering bits in place of the samples that are not present at outputs 24R, 26G, and 24B respectively. The steering bits are applied to a majority logic circuit 30. Majority logic circuit 30 is a means of deciding, based on majority voting of the three sets of steering bits, which of the three sets of steering bits will best represent all three channels during reconstruction at the receiver. Thus, if any two or more sets of steering bits are the same, they will be transmitted as the majority steering bits called "Sm" at output 31 and are present for 140 nanoseconds. Otherwise the bits from a single component will be selected. Since green is the largest component of a luminance signal, it is preferable to select its steering bits for transmission. Alternately, steering bits may be chosen from the component signal having the largest amplitude. The selected steering bits are applied to two-bit input contact 28S of switch 32. Rate control circuit 34 sequentially moves switch 32 among the contacts 28 so that at one-bit output 36 the transmitted samples from each of the color component channels are serially supplied along with the single set of steering bits from majority logic circuit 30. Since there are a total of 26 (3 channels×8 bits+1 channel×2 bits) contacts 28, switch 32 must cycle at a rate 26 times that of the data rate of the signals at outputs 24R, 24G, 24B of the encoders 22R, 22G, and 22B. With this system, the samples and data can be represented as shown in FIG. 3 where the number of steering bits is reduced to ⅓ of that needed for fully independent steering of each channel as shown in FIG. 1.

The picture is reconstructed exactly as in the independent channel case of the prior art except that the majority steering bits are used to steer all three channels as is shown in the receiver of FIG. 4. The transmitted data is received at terminal 38 and applied to a serial-to-parallel converter 40 which simultaneously applies the red transmitted samples to input 42R of red decoder 44R, the green transmitted samples to input 42G of green decoder 44G, and the blue transmitted samples to input 42B of blue decoder 44B. Further, the majority steering bits are simultaneously applied in parallel to inputs 46R, 46G, and 46B of the decoders 44R, 44G, and 44B respectively. Decoder 44R provides at output terminal 48R, the reconstructed digital red signal; the decoder 44G supplies at output terminal 48G, the reconstructed digital green signal; and the decoder 44B applies an output terminal 48B, the reconstructed digital blue signal, all of the reconstruction having been done using majority steering bits.

The same concept of using a single set of steering bits may also be used in a luminance (Y) and two color component (I,Q; R-Y, B-Y) system with one slight difference. The Y channel will have a higher data rate and consequently a higher bandwidth than either the I or Q channels. Hence, since the luminance channel Y will have more resolution than the color channels I and Q, the direction of reconstruction indicated for this channel will be adequate for the lower bandwidth channels. Therefore, steering bits derived only from the Y channel are used to reconstruct the luminance as well as the color component channels. As shown in FIG. 5, Y, I and Q digital signals are received at input terminals 50, 52 and 54. In a particular embodiment, the Y signal comprises samples occurring at four times the color subcarrier frequency, while the I and Q signals comprise samples occurring at only twice the subcarrier frequency. The signals are applied to encoders 56Y, 56I and 56Q. Samples occurring at two times the subcarrier frequency are provided by the encoders at output 58Y and at the subcarrier frequency at outputs 58I and 58Q. Encoder 56Y also provides steering bits at output 60. These steering bits occur at twice the subcarrier rate. All of these signals are applied to a parallel-to-series converter 62 where they are sequentially sent as serial data over a transmission path 664 to a serial-to-parallel converter 66. Serial-to-parallel converter 66 simultaneously provides steering bits from the Y signal to decoders 68Y, 68I and 68Q. It also provides the Y signal to decoder 68Y, the I signal to decoder 68I, and the Q signal to decoder 68Q. The decoder 68Y provides a reconstructed digital Y signal occurring at four times the subcarrier frequency at output terminal 70Y, the decoder 68I provides a reconstructed digital I signal which occurs at two times the subcarrier frequency at output terminal 70I, and the decoder 68Q provides a reconstructed digital Q signal at output terminal 70Q which occurs at two times the subcarrier frequency.

Figure 9:
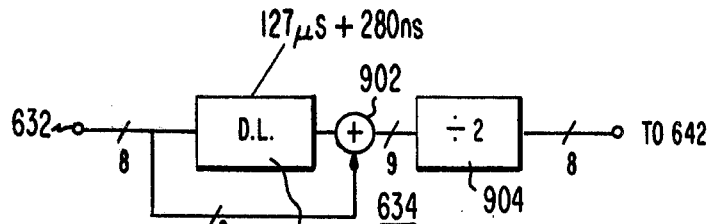
FIGS. 9, 10, 11 and 12 illustrate block diagrams of filters used in FIGS. 6 and 7.
Figure 10:
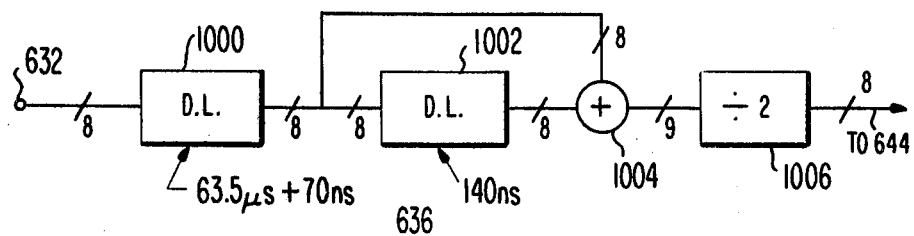
Figure 11:
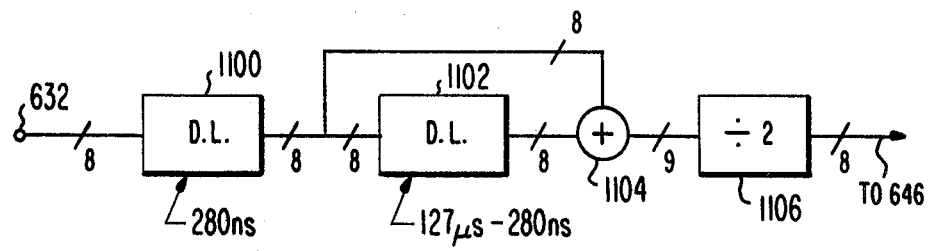
Figure 12:
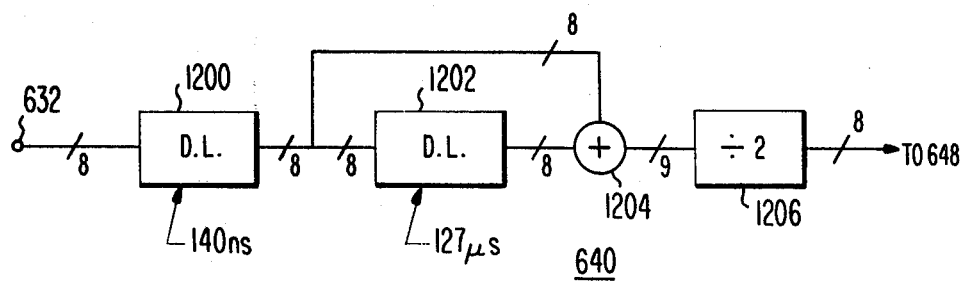

FIG. 6 illustrates an encoder for use in FIGS. 2 and 5. An input 632 receives the digital video signal having samples occurring, in a particular embodiment, at 14.32 MHz with 8 bits per sample. The 8 bits of each sample are applied to a delay line 641 and to filters 634, 636, 638 and 640. These filters are used to provide the average of the surrounding samples. By "average" is meant adding together the signal values represented by each of the two 8-bit samples and then dividing the resulting sum by two. As can be determined by inspection of FIG. 1, sample points 128 and 130 are spaced in time by two horizontal lines and four signal sampling intervals. This corresponds to approximately 127 microseconds, in the NTSC system, plus 280 nanoseconds. FIG. 9 illustrates the details of filter 634 which comprises a digital delay line 900 having a delay of 127 microseconds plus 280 nanoseconds coupled between input terminals 632 and an input terminal of a digital adder 902. undelayed signals from terminal 632 also are coupled to a second input terminal of adder 902. The digital sum of these signals, corresponding to the video signals at sample points 128 and 130, is obtained at the output terminal of adder 902 and coupled to an input terminal of a digital divider 904. Divider 904 divides this summed signal by two to provide at its output terminal an 8-bit parallel signal representing the average signal of sample points 128 and 130. This averaged signal is coupled to an input terminal of a comparator 642 in FIG. 6. Delay line 641 also comprises an 8-bit digital delay line and has a delay of about 63.5 microseconds plus 140 nanoseconds. This time is equal to one-half of the total delay of delay line 900 of filter 634, and delays the video at sample point 114 of FIG. 1 that is not to be transmitted so it will be in time coincidence with the averaged signal from filter 634 so the two signals can be compared by comparator 642. Filter 636 supplies the average of points 120 and 122 (a "horizontal" average). It comprises an 8-bit wide digital delay line 1002 in FIG. 10 having a delay of about 140 nanoseconds. The input (undelayed) and output (delayed) signals of this delay line are averaged by adder 1004 and divider 1006. An additional equalizing delay of one line plus 70 nanoseconds to compensate for the delay line 641 is provided by delay line 1000 within filter 636. The output signal of filter 636 from divider 1006 is supplied to a comparator 644 in FIG. 6. Filter 638 supplies the average of diagonal points 124 and 126 (a "second diagonal" average). It comprises an 8-bit digital delay line 1102 in FIG. 11 having a delay of two horizontal lines minus 280 nanoseconds. The delayed and undelayed signals are averaged by adder 1104 and divider 1106, while the digital signal from input 632 is first delay equalized by a 280 nanosecond delay line 1100. The output signal from divider 1106 is applied to a comparator 646 in FIG. 6. Lastly, filter 640 supplies the average of points 116 and 118 (a "vertical" average). It comprises an 8-bit digital delay line 1202 in FIG. 12 having a delay of two horizontal lines. The delayed and undelayed signals are averaged by adder 1204 and divider 1206, while the digital signal from input 632 is first delay equalized by a 140 nanosecond delay line 1200. The output signal from divider 1206 is applied to a comparator 648 in FIG. 6.

Figure 13:
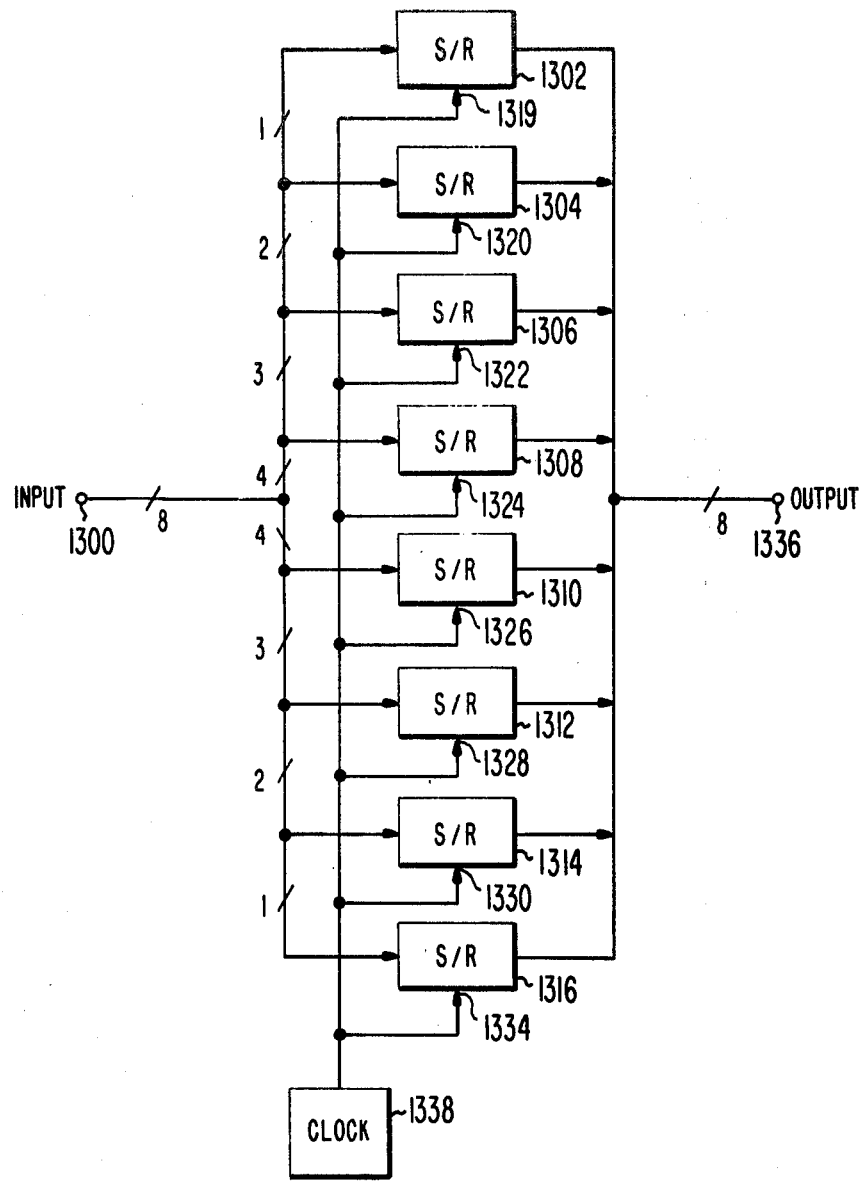
Fig. 13 shows a block diagram of a digital delay line used in FIGS. 6, 7, 9, 10, 11, and 12.

FIG. 13 shows an 8-bit wide delay line for use in the filters 634, 636, 638 and 640 and delay 641. It comprises eight shift registers 1302, 1304, 1306, 1308, 1310, 1312, 1314 and 1316, each of which receives one bit of the 8-bits simultaneously present at input 1300. The bits are shifted within the registers under the control of a clock signal from clock 1338 coupled to shift inputs 1318, 1320, 1322, 1324, 1326, 1328, 1330, and 1334. The number of stages of the shift registers are chosen to achieve the desired delay. The outputs of the shift registers are coupled to 8-bit parallel output 1336. Comparators 642, 644, 646 and 648 each comprise an 8-bit subtractor that also receives the original 8-bit samples through delay line 641 in addition to the outputs of filters 634, 636, 638 and 640 respectively. The respective two signals in each comparator are subtracted and then the absolute value is taken of the resulting difference. The comparators apply absolute value signals to a minimum error logic circuit 650.

Figure 8:
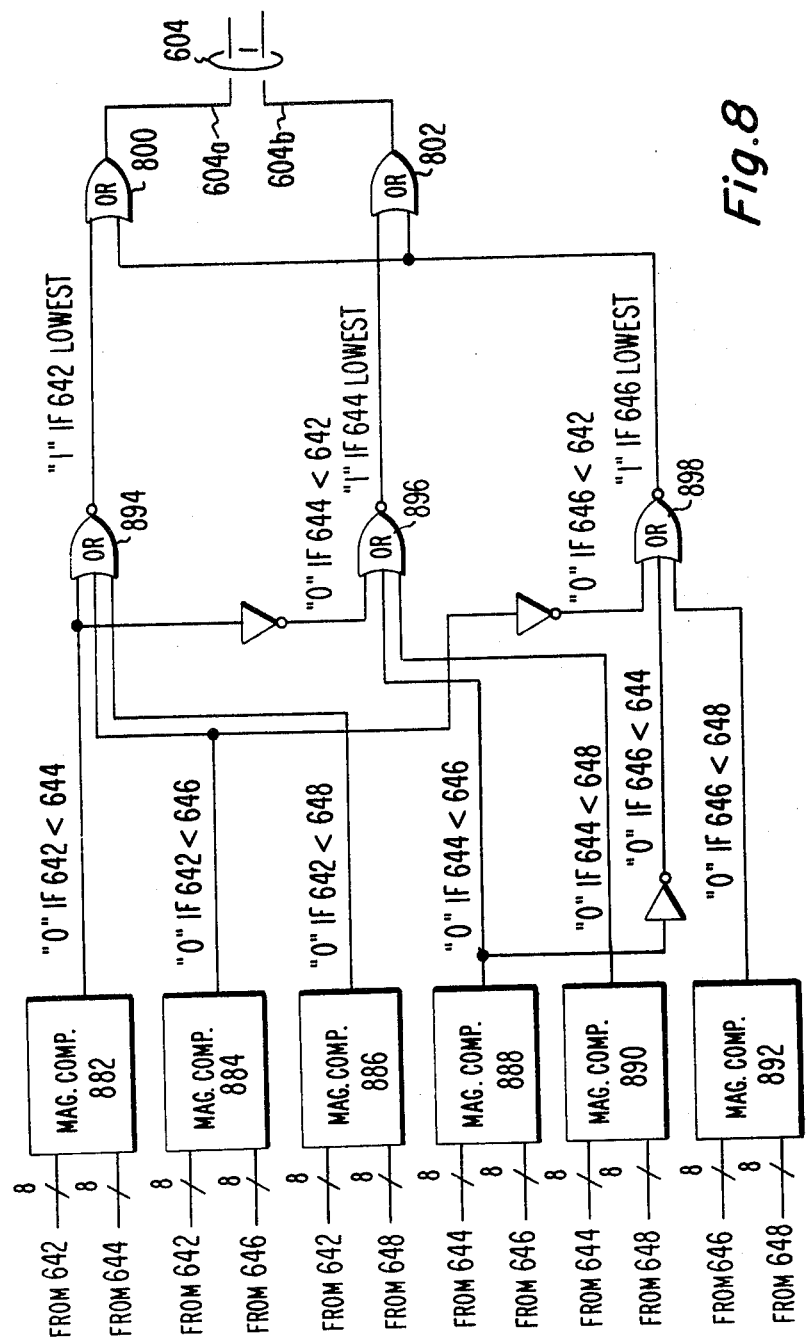
FIG. 8 shows a block diagram of a minimum-error logic circuit used in FIG. 6.

As shown in FIG. 8, minimum error logic circuit 650 comprises 6 magnitude comparators 882, 884, 886, 888, 890 and 892, each of which receives two 8-bit numbers from different pairs of the output signals of comparators 642, 644, 646 and 648 and supplies at its respective output a one-bit logic level indication to indicate which of the two respective input numbers is smaller. It should be noted that there are only six possible combinations of four numbers taken in pairs, thus giving rise to the six magnitude comparators. It is only necesary to look at three of the magnitude comparator outputs to determine if a specific magnitude comparator input is the lowest. Thus NOR gates 894, 896, and 898 are used to detect if the output signal from comparators 642, 644, and 646 respectively are the lowest. If none are the lowest, the output signal from 648 is assumed to be the lowest which will be true, or none will be lowest, i.e., they are all equal, in which latter case the output signal from any comparator will do. The output signals from gates 894, 896, and 898 are coded by OR gates 800 and 802 into the 2-bit control signal on bus 604 in accordance with the following truth table:

| Line No. | Lowest Signal | | | |
| --- | --- | --- | --- | --- |
|  | 642 | 644 | 646 | 648 |
| 604a | 1 | 0 | 1 | 0 |
| 604b | 0 | 1 | 1 | 0 |

The output of logic circuit 650 comprises two bits in accordance with the above table which indicate which of the pairs of samples of adjacent points is the closest match, i.e., represents which direction has the least change of the video signal around the sample point 114. This two-bit signal makes up the control signal indicating which of the transmitted video sample signals most closely represents the untransmitted video signal so that complete video information can be obtained upon decoding. The two central bits are applied to a switch 652 in FIG. 6, which is a two-bit switch operated in synchronization with an 8-bit switch 654 in FIG. 6 at a 7.16 MHz switching rate. This switching rate, since it is 14.32 MHz divided. by 2, causes switch 654 to pass or transmit only every other 8-bit sample. The 2 control bits from logic circuit 650, that indicate which of the adjacent samples are to be used in reconstructing the untransmitted points, are passed by switch 652, and together with the 8 bits simultaneously passed by switch 654 representing a transmitted point, form a 10-bit parallel word at 10-bit parallel output 655.

FIG. 7 shows the decoder. The 10-bit parallel signal is received at input 760. The 8 bits representing a sample of a picture point are applied by 8-bit bus 761 to filters 762, 764, 766 and 768, the internal construction of which is the same as filters 634, 636, 638 and 640 respectively. The same 8 bits are also applied to contact 769a of 8-bit switch 770 through delay line 706 that has the same delay as delay line 641 and which compensates for the delay through filters 762, 764, 766, and 768. The two control bits are brought out on 2-bit bus 771 and applied to control decoder 772 for control of switches 774, 776, 778, and 780. This decoder comprises a one-of-four decoder, such as integrated circuit No. Ser. No. 74S139, manufactured by Texas Instruments, that takes the two control bits and gives a 4-bit parallel output, only one of which will be high. The 4 parallel bits are applied to the switches 774, 776, 778 and 780 respectively. Since only one of the outputs of control decoder 772 will be high, only one of the switches 774, 776, 778 and 780 will be closed at any one time at a 7.16 MHz rate. This applied the signal from that one of the filters 762, 764, 766, and 768 which is the closest match of a missing sample to contact 769b of switch 770. Switch 770 is switched at a 14.32 MHz rate between its two inputs 769a and 769b, and thus alternately supplies a sample point of the original picture and a reconstructed 8-bit signal to its outupt 769c and to decoder output 782. Since each of the signals occurs at a 7.16 MHz rate, the resulting signal from output 769c of switch 770 is at 14.32 MHz.

Figure 14:
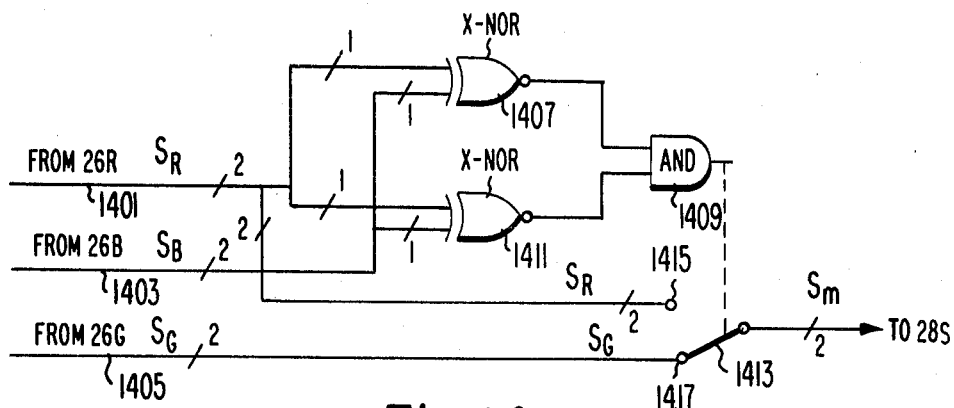
FIG. 14 shows a block diagram of a majority logic circuit used in FIG. 2.

FIG. 14 shows a block diagram of a majority logic circuit 30 used in FIG. 2. In general, the prior art uses the following rules in order to select the steering bits. If the red, blue and green sets of steering bits are all the same, then any one of the sets can be used, and in this embodiment the red set is used. If red and green or blue and green are the same, then the green set is used. If red and blue are the same, then either red or blue can be used, and in this embodiment red is used. If all steering bits are different, the green set is used.

As shown in FIG. 14, red, blue and green steering bits ($S_R$, $S_B$, and $S_G$) are received on two-bit lines 1401, 1403 and 1405 respectively from encoder outputs 26R, 26B, 26G respectively. The first pair of corresponding bits of the red and blue steering bits are applied to respective inputs of exclusive-NOR gate 1407. Gate 1407 supplies a high signal to one input of AND gate 1409, if both of its inputs are the same. The remaining second pair of corresponding bits of the red and blue sets of steering bits are applied to respective inputs of exclusive-NOR gate 1411. Gate 1411 supplies a high signal to the other input of AND gate 1409, if both of its inputs are high. Gate 1409 supplies a high signal if both its inputs are high, i.e., there is a match between both corresponding pairs of the red and blue steering bits. The high signal from gate 1409 controls two-bit switch 1413 so its wiper arm is contacting contact 1415 (the position not shown in FIG. 14) to supply to input 28S of FIG. 2 the red steering bits for use as majority steering bits. If there is no match for either of the corresponding pairs, then the output signals from either or both of gates 1407 and 1411 is low and hence the output signal from gate 1409 is also low. Switch 1413 then is in the position shown in FIG. 14, i.e., contacting contact 1417, and the green steering bits are supplied as the majority steering bits. Thus, the rules described above are carried out.

Figure 15:
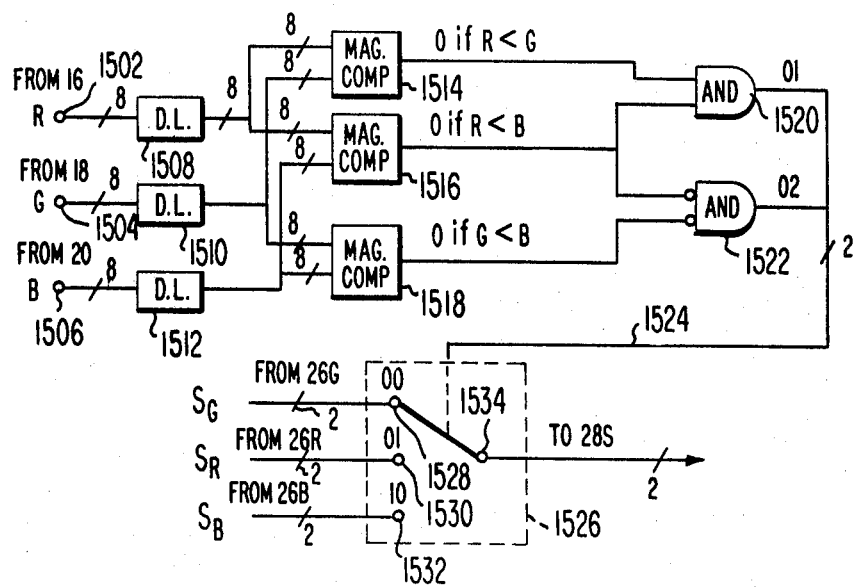
FIG. 15 shows a block diagram of a steering bit generator that is used in place of the majority logic circuit used in FIG. 2.

FIG. 15 shows a block diagram of a circuit used instead of majority logic circuit 30 of FIG. 2. The circuit of FIG. 15 provides steering bits from whichever of signals R, G or B has the greatest amplitude. Input terminals 1502, 1504, 1506 are coupled to input terminals 16, 18, and 20 respectively and respectively receive the red, green, and blue digital signals, and respectively apply said signals to eight-bit digital delay lines 1508, 1510 and 1512, which delay lines have the same delay as is inherent in encoders 22R, 22G, 22B. The red and green delayed signals are then applied to magnitude comparator 1514. The delayed green signal is also applied to magnitude comparator 1518, while the delayed blue signal is applied to magnitude comparators 1516 and 1518. Magnitude comparator 1516 supplies a zero signal to AND gates 1520 and 1522 if the red signal is less than the blue signal. Similarily, comparator 1518 supplies a zero signal to gate 1522 if the green signal is less than the blue signal.

The output signals from gates 1520 and 1522 are called "01" and "02" respectively and are determined in accordance with the following truth table.

| Video Signal | Output Of | | | | |
| Condition | 1514 | 1516 | 1518 | 01 | 02 |
| --- | --- | --- | --- | --- | --- |
| R < G < B | 0 | 0 | 0 | 1 | 0 |
| R < B < G | 0 | 0 | 1 | 0 | 0 |
| B < R < G | 0 | 1 | 1 | 0 | 0 |
| G < R < B | 1 | 0 | 0 | 1 | 0 |
| G < B < R | 1 | 1 | 0 | 0 | 1 |
| B < G < R | 1 | 1 | 1 | 0 | 1 |

The output signals 01 and 02 are present on two-bit bus 1524, and are used to control switch 1526, which switch has input terminals 1528, 1530 and 1532 that receive green, red, and blue steering bits from outputs 26G, 26R and 26B respectively. An output terminal 1534 supplies to terminal 28S steering bits in accordance with output signals 01 and 02 (as indicated next to terminals 1528, 1530, and 1532), which in turn is in accordance with the R, G or B signal having the largest amplitude.

Figures 16, 17A, 17B:
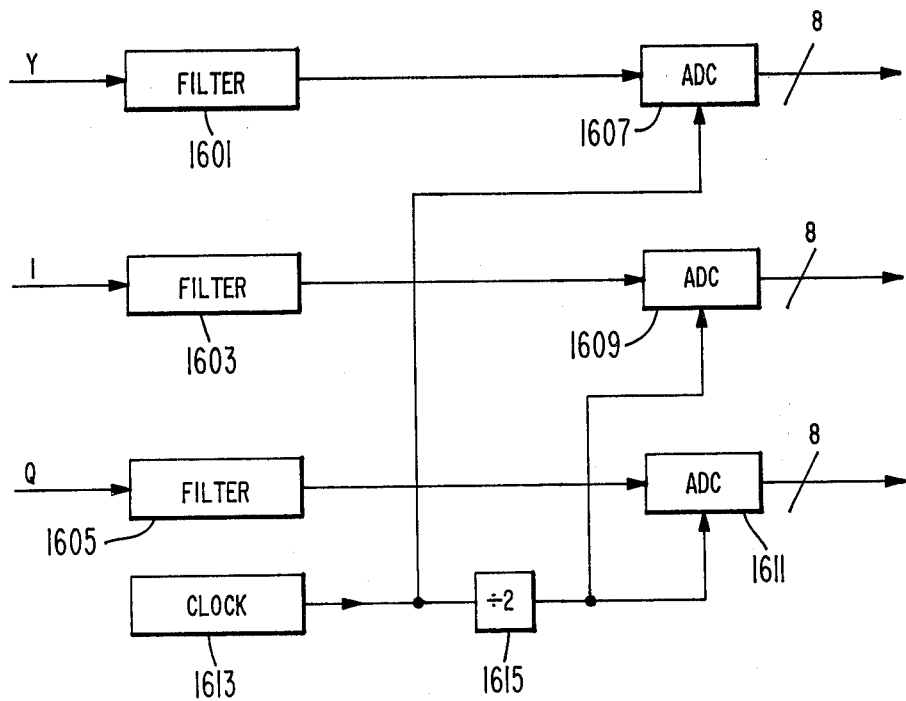
FIG. 16 shows an encoder in accordance with the invention.

FIG. 16 shows another embodiment of an encoder in accordance with the invention. Y, I and Q analog signals are applied to LPFs (low pass filters) 1601, 1603, and 1605 respectively. The output signals from the LPFs 1601, 1603 and 1605 are applied to ADCs (analog to digital converters) 1607, 1609, and 1611, respectively. A clock signal at about four times the color subcarrier frequency (4xSC) is generated by generator 1613 and applied as a sampling signal to ADC 1607 and to divide-by-two frequency divider 1615. The twice subcarrier frequency (2xSC) from divider 1615 is applied as a sampling signal to ADCs 1609 and 1611. The 8-bit output signals from the ADCs comprise digital samples of the analog input signals. The position of the Y signal samples on a scanning raster is shown in FIG. 17(a). The exact value of the frequency of the clock signal from generator 1613 is chosen to have an odd number of samples in each scanning line. This choice causes the 2xSC samples of both the I and Q signals to be alternate-line offset with respect to signals of the same type, as shown in FIG. 17(b). Other ways of achieving sample offset are known. For example, if an even number of samples in each scanning line is used, then the divided 2xSC clock signal can be "paled", which is a shifting of the phase of the clock signal by 180 degrees from line to line.

In FIG. 16 all of the LPFs have a cut-off frequency slightly less than 2xSC. Since the Nyquist limit for the I and Q channels is about 1xSC, aliasing will occur in these channels which will be apparent upon decoding. That is, the channel bandwidth allows passage of signals sampled at rates at which alias occurs. However, due to the phase offset depicted in FIG. 17(b), the aliasing will usually occur in a raster direction other than the direction of the high frequency (highest resolution) information. Thus, it is usually possible to remove the aliasing by filtering in the direction of the alias.

Figure 18:
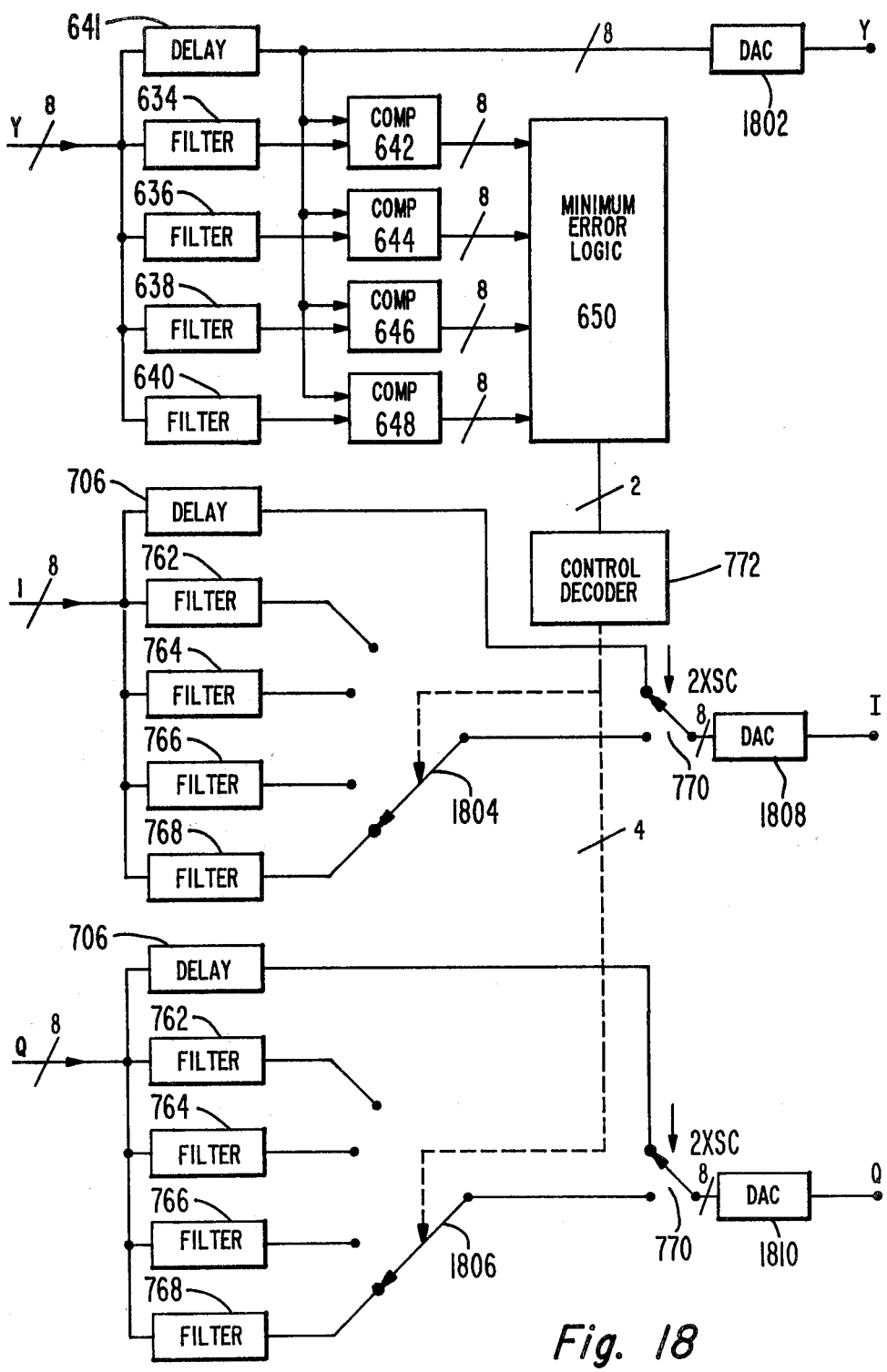
FIG. 18 shows a decoder in accordance with the invention.

FIG. 18 shows a decoder circuit for accomplishing this. The 8-bit 4xSC rate Y signal from FIG. 16 is applied to a circuit almost identical to FIG. 6 and to DAC (digital to analog converter) 1802 that provides the analog Y output signal. As in FIG. 6, equalizing delay line 641, filters 634, 636 and 640, comparators 642, 644, 646 and 648 and minimum error logic 650 all serve to detect in which direction the Y signal has the least resolution (least amount of change) and to provide a 2-bit output signal from logic 650 that conveys this information. This information will be accurate since the sampling rate for the Y signal satisfies the Nyquist criterion, and therefore there is no aliasing in the Y channel.

The 8-bit 2xSC rate I and Q signals are respectively applied to circuits that are essentially the same as the decoder of FIG. 7, except that there is now a common control decoder 772. The filters 762, 764, 766 and 768 provide I or Q signals averaged in four direction, and control decoder 772 sets switches 1804 and 1806 to provide an output signal averaged in the direction of least resolution as determined from the Y signal. The signal samples from switches 1804 and 1806 are interpolated between the signal samples from delay lines 706. This filtering removes aliasing in that direction. For example, if the scene is of a picket fence having vertically aligned pickets, there is horizontal information and the aliases in the I and Q signals are in the vertical direction. The alias free Y signal indicates that the direction of least resolution is vertical, and this is the direction in which the filtering is done, i.e. selected as output signals by switches 1804 and 1806. Switches 770 are switched at 2xSC and alternately provide the delay-equalized 2xSC signals from delay lines 706, and the 2xSC now alias-free signals from switches 1804 and 1806. Thus high definition 4xSC rate signals are applied to DACs 1808 and 1810 in channels having a bandwidth equal to the sampling rate, without the adverse effect of alias. Therefore analog Y, I and Q signals are available at the outputs of DACs 1802, 1808 and 1810 resepctively. Instead of I and Q signals, other color difference signals, such as B-Y and R-Y, could have been used.

It will be appreciated that other embodiments are possible within the spirit and scope of the invention. For example, the samples could be analog samples, or the invention can be applied to a system where the Y signal is not sampled and the I and Q signals amplitude modulate a color subcarrier.

What is claimed is:

1. A method for removing aliases from at least a first component signal of a video signal using one alias free component of said video signal, said method comprising determining from said alias free component the direction of least resolution, and averaging said alias containing component in said direction.

2. A method as claimed in claim 1, further comprising a second alias containing component signal, and wherein said alias containing component signals comprise color difference signals and said alias free signal comprises a luminance signal.

3. A method as claimed in claim 1, wherein said determining step comprises averaging said alias free signal in a plurality of directions, forming the absolute values of the differences between said averages and a reference signal, and selecting the minimum absolute value.

4. A method as claimed in claim 1, wherein said averaging step comprises forming averages of said alias containing component in a plurality of directions, and selecting the average in the direction of least resolution.

5. A method of encoding at least two signal components of a video signal, comprising periodically sampling at least a first signal component with offset samples, said first signal component having frequency components that can exceed one half the sampling frequency, and sampling a second signal component at a frequency at least about twice the maximum of its highest frequency and about twice the sampling frequency of said first component signal.

6. A method as claimed in claim 5, further comprising periodically sampling a third signal component of said video signal with offset samples, said third signal component having frequency components that can exceed one half the sampling frequency, said first and third signal components comprising color difference signals, said second signal component comprising a luminance signal.

7. An apparatus for removing aliases from at least a first component signal of a video signal using one alias free component of said video signal, said apparatus comprising determining means for determining from said alias free component the direction of least resolution, and averaging means for averaging said alias containing component in said direction.

8. An apparatus as claimed in claim 7, said apparatus further comprising a second alias containing component signal, and wherein said alias containing component signals comprise color difference signals and said alias free signal comprises a luminance signal.

9. A method as claimed in claim 7, wherein said determining means comprises filter means averaging said alias free signal in a plurality of directions, comparator means for forming the absolute values of the differences between said averages are a reference signal, and minimum error logic means for selecting the minimum absolute value.

10. An apparatus as claimed in claim 7, wherein said averaging means comprises filter means for forming averages of said alias containing component in a plurality of directions, and control decoder means for selecting the average in the direction least resolution.

11. An apparatus for encoding at least two signal components of a video signal, comprising means for periodically sampling at least a first signal component with offset samples, said first signal component having frequency components that can exceed one half the sampling frequency, and means for sampling a second signal component at a frequency at least about twice the maximum of its highest frequency and about twice the sampling frequency of said first component signal.

12. An apparatus as claimed in claim 11, further comprising means for periodically sampling a third signal component of said video signal with offset samples, said third signal component having frequency components that can exceed one half the sampling frequency, said first and third signal components comprising color difference signals, said second signal component comprising a luminance signal.

* * * * *

UNITED STATES PATENT AND TRADEMARK OFFICE
CERTIFICATE OF CORRECTION

PATENT NO. : 4,417,269

DATED : November 22, 1983

INVENTOR(S) : Robert Adams Dischert

It is certified that error appears in the above-identified patent and that said Letters Patent is hereby corrected as shown below:

Col. 6, line 45   "outupt" should be -- output --

Col. 10, line 19   "are" should be -- and --

Signed and Sealed this

Seventeenth Day of April 1984

[SEAL]

Attest:

GERALD J. MOSSINGHOFF

Attesting Officer      Commissioner of Patents and Trademarks